US007010886B2

(12) United States Patent
Deguchi et al.

(10) Patent No.: US 7,010,886 B2
(45) Date of Patent: Mar. 14, 2006

(54) FIXING STRUCTURE OF A DOOR WEATHER STRIP

(75) Inventors: Koso Deguchi, Hiroshima-ken (JP); Toshifumi Matsuura, Hiroshima-ken (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 193 days.

(21) Appl. No.: 10/764,610

(22) Filed: Jan. 26, 2004

(65) Prior Publication Data

US 2004/0177562 A1    Sep. 16, 2004

(30) Foreign Application Priority Data

Mar. 14, 2003    (JP) .............................. 2003-069431

(51) Int. Cl.
*E06B 7/16*    (2006.01)

(52) U.S. Cl. ................... 49/479.1; 49/492.1; 49/493.1; 296/146.9

(58) Field of Classification Search ............... 49/479.1, 49/492.1, 493.1, 475.1, 502; 296/146.9; 277/921, 906, 628

See application file for complete search history.

(56) References Cited

U.S. PATENT DOCUMENTS

| 2,902,732 A | * | 9/1959 | Beck et al. ................. 49/493.1 |
| 4,409,756 A | * | 10/1983 | Audenino et al. .......... 49/493.1 |
| 4,864,774 A | * | 9/1989 | Onishi et al. ................. 49/440 |
| 5,052,743 A | * | 10/1991 | Inada et al. ................. 49/493.1 |
| 5,433,038 A | * | 7/1995 | Dupuy .......................... 49/377 |
| 5,950,366 A | * | 9/1999 | Uhlmeyer .................. 49/492.1 |
| 6,112,468 A | * | 9/2000 | Aritake et al. ............. 49/475.1 |
| 6,487,820 B1 | * | 12/2002 | Nakajima et al. .......... 49/490.1 |
| 6,598,348 B1 | * | 7/2003 | Palicki ....................... 49/479.1 |
| 6,848,218 B1 | * | 2/2005 | Langemann ................ 49/495.1 |
| 6,942,225 B1 | * | 9/2005 | Gentemann et al. ....... 49/493.1 |

* cited by examiner

*Primary Examiner*—Hugh B. Thompson, II
(74) *Attorney, Agent, or Firm*—Flynn, Thiel, Boutell & Tanis, P.C.

(57) ABSTRACT

There is provided a fixing structure of a door weather strip which comprises a weather strip for a car and an insert clip for fixing a molding part of the weather strip to a door panel. The weather strip comprises a molding part having an insertion hole, and bag-shaped fitting grooves which are formed above the insertion hole at an outer side of the molding part, each having an opening at the lower end thereof. The insert clip comprises a plate-shaped body part having a clip part which projects laterally from the body part and is inserted into the insertion hole of the weather strip to fix the weather strip to the door panel. The insert clip also comprises pawl parts which stand upright from the outer end of the body part, and each pawl part tightly fits in a corresponding fitting groove of the weather strip.

4 Claims, 4 Drawing Sheets

FIXING STRUCTURE OF A DOOR WEATHER STRIP

FIELD OF THE INVENTION

The invention relates to a fixing structure of a door weather strip for a car for fixing a molding part of the door weather strip to a door panel with an insert clip.

BACKGROUND OF THE INVENTION

A conventional fixing structure of a door weather strip for a car is described with reference to FIGS. 1 to 3. In some cases, insert clips 30 have been used for fixing a molding part 11 of a weather strip 10 to a door panel 1 of a car, which forms a corner part of the weather strip 10.

The insert clip 30 has a clip part 31 protruded from the center thereof so as to fix the weather strip 10 to the door panel 1, and a catch part 32 provided at the upper portion of the clip part 31 for preventing the insert clip 30 from coming off from the weather strip 10 or from rotating.

However, in the conventional fixing structure of a door weather strip, since the molding part 11 of the weather strip 10 is fixed to the door panel 1 with the insert clip 30, the fixed structure of the insert clip 30 and the weather strip 10 is incomplete that the insert clip 30 and the weather strip 10 are not firmly integrated with each other.

Accordingly, there arises a problem that a gap 33 is produced between the insert clip 30 and the weather strip 10 thereby lowering a sealing property between the weather strip 10 and the door panel 1. Further, there arises another problem that the insert clip 30 moves from its proper position in the weather strip 10 thereby lowering an external appearance.

SUMMARY OF THE INVENTION

The invention has been devised in view of these problems set forth above and it is an object of the invention to improve a sealing property and external appearance of a fixing structure of a door weather strip, which is fixed to a door panel of a car at a molding part thereof with an insert clip.

The fixing structure of a door weather strip according to the invention is now described with reference to FIG. 1 and FIGS. 4 to 7. The fixing structure of a door weather strip according to a first aspect of the invention comprises a weather strip 10 for a car and an insert clip 20 for fixing a molding part 11 of the weather strip 10 to a door panel 1. The weather strip 10 comprises a molding part 11 having an insertion hole 12, and bag-shaped fitting grooves 13 which are formed above the insertion hole 12 at an outer side of the molding part 11, each having an opening at the lower end thereof. The insert clip 20 comprises a plate-shaped body part 21 having a clip part 22 which projects laterally from the body part 21 and is inserted into the insertion hole 12 of the weather strip 10 to fix the weather strip 10 to the door panel 1. The insert clip 20 also comprises pawl parts 23 which stand upright from the outer end of the body part 21, and each pawl part 23 tightly fits in a corresponding fitting groove 13 of the weather strip 10.

The fixing structure of a door weather strip according to a second aspect of the invention comprises a weather strip 10 for a car and an insert clip 20 for fixing a molding part 11 of the weather strip 10 to a door panel 1. The weather strip 10 comprises a molding part 11 having an insertion hole 12, and bag-shaped fitting grooves 13 which are formed above the insertion hole 12 at an outer side of the molding part 11, each having an opening at the lower end thereof. The insert clip 20 comprises a plate-shaped body part 21 having a clip part 22 which projects laterally from the body part 21 and is inserted into the insertion hole 12 of the weather strip 10 to fix the weather strip 10 to the door panel 1. The insert clip 20 also comprises pawl parts 23 which stand upright from the outer end of the body part 21, and each pawl part 23 fits in a corresponding fitting groove 13 of the weather strip 10. An inner surface of an outside wall 14 forming a part of the fitting groove 13 forms a curved convex surface 15. An outside surface of a pawl part 23, which makes a contact with a corresponding curved convex surface 15, forms a curved concave surface 24.

The fixing structure of a door weather strip according to a third aspect of the invention comprises an embedding recess 16 in which the body part 21 of the insert clip 20 is embedded. The recess 16 is formed in the outer side of the molding part 11 of the weather strip 10.

PREFERRED EMBODIMENT OF THE INVENTION

Figure 1:
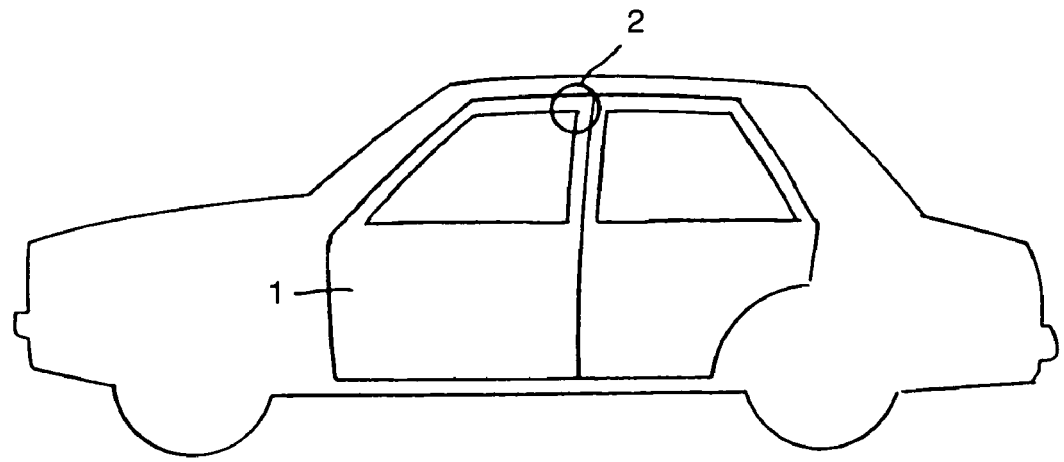
FIG. 1 is a side view of a car showing a position of a fixing structure of a door weather strip according to the invention.
Figure 2:
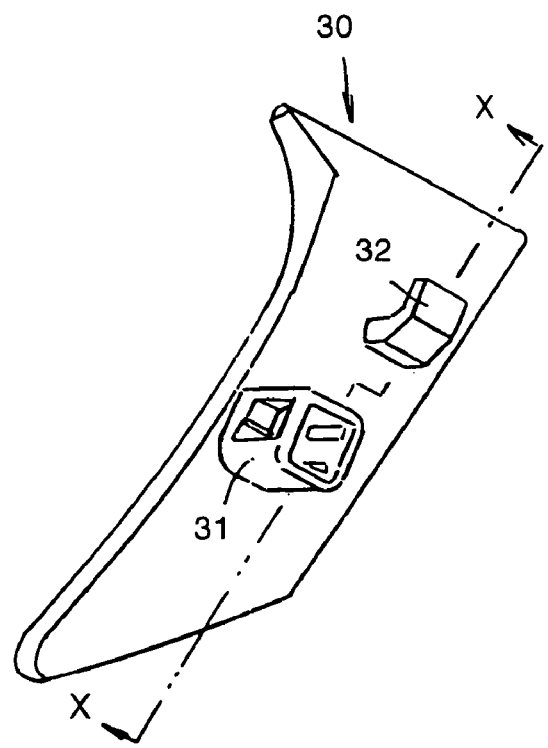
FIG. 2 is a rear view of an insert clip used in a conventional fixing structure.
Figure 3:
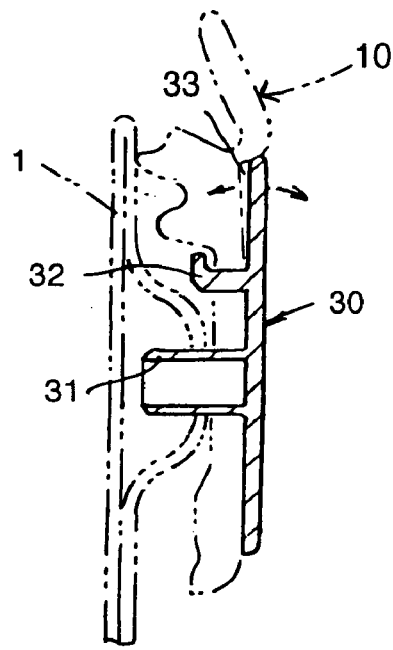
FIG. 3 is a sectional view along line X—X in FIG. 2 showing a conventional fixing structure.
Figure 4:
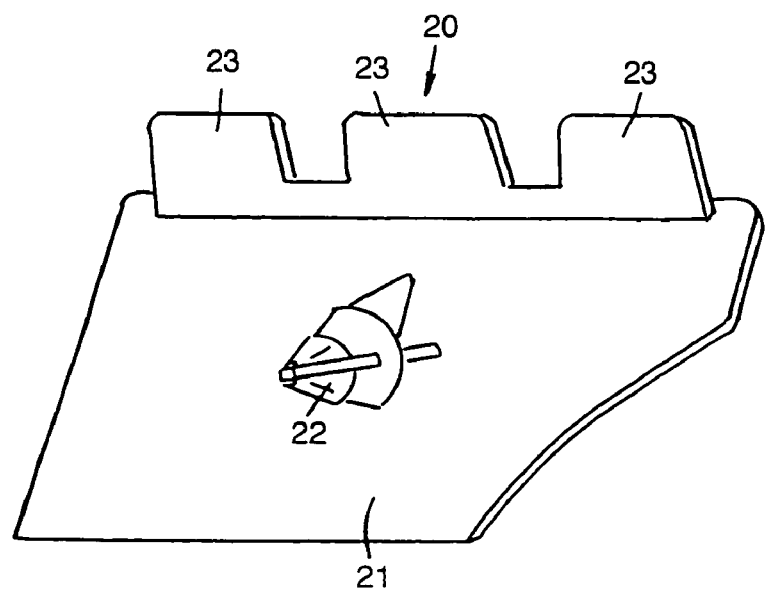
FIG. 4 is a rear view of an insert clip used in an embodiment of a fixing structure of the invention.

A fixing structure of a door weather strip according to the invention is now described with reference to FIG. 1 and FIGS. 4 to 7. This fixing structure comprises a door weather strip 10 and an insert clip 20. The door weather strip 10 comprises an extrusion part 17 which forms a linear part of the weather strip 10, and a molding part 11 which forms a corner part of the weather strip 10. The molding part 11 of the weather strip 10 is fixed to a door panel 1 with the insert clip 20. Although, the corner part 2 according to this embodiment locates between a roof part and a center pillar part, the invention can be applied to any other corner parts as well.

According to the fixing structure of the embodiment, an insertion hole 12 is formed at the center of the weather strip 10 (molding part 11), and three bag-shaped fitting grooves 13 are formed above the insertion hole 12 at an outer side of the molding part 11. Each fitting groove 13 has an opening at the lower end thereof. The insert clip 20 has a clip part 22 which projects laterally from a substantially plate-shaped body part 21 and is inserted into the insertion hole 12 of the weather strip 10 and is retained by a hole formed in the door panel 1 so as to fix the weather strip 10 to the door panel 1. Three pieces of pawl parts 23 are provided upright from the upper end of the body part 21, and each of which fits tightly into a corresponding fitting groove 13 out of three formed in the weather strip 10. The number of pawl parts 23, however, is not limited to three.

According to the fixing structure of the door weather strip of the embodiment having such an arrangement, the weather strip 10 can be firmly fixed to the door panel 1 with the clip part 22 of the insert clip 20.

Figure 5:
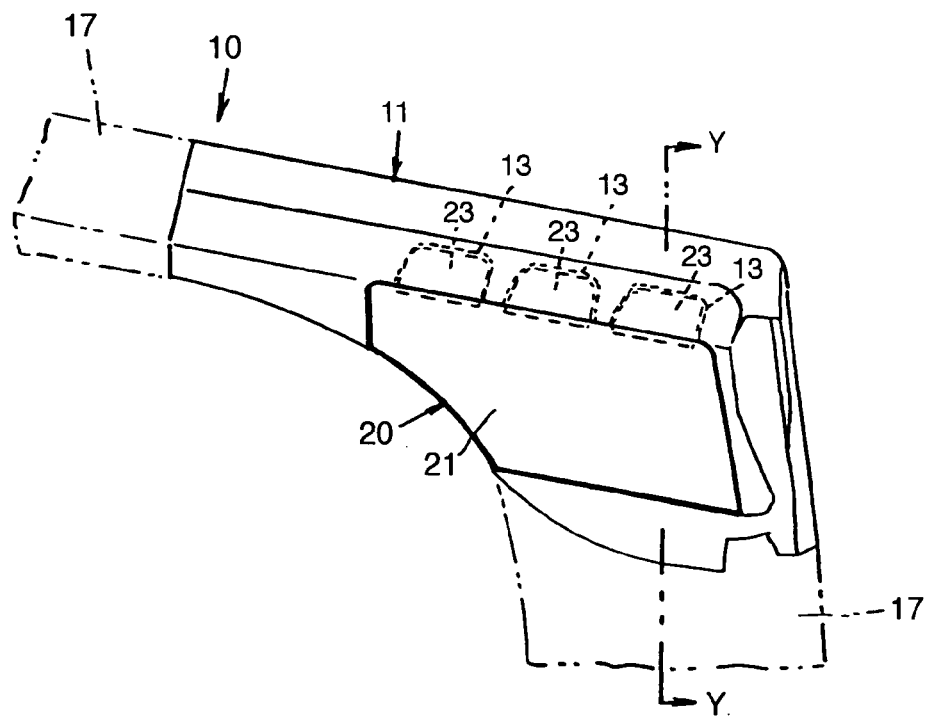
FIG. 5 is a side view of an embodiment of a fixing structure of the invention.
Figure 6:
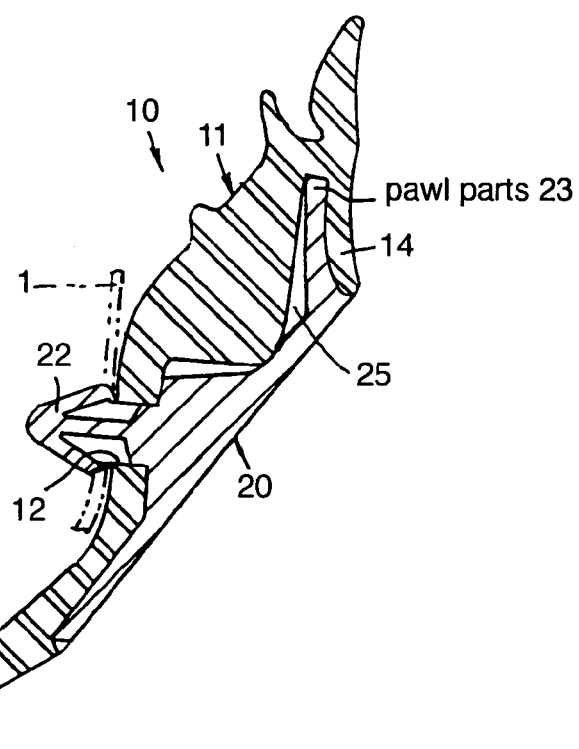
FIG. 6 is a sectional view of a fixing structure along line Y—Y in FIG. 5.
Figure 7:
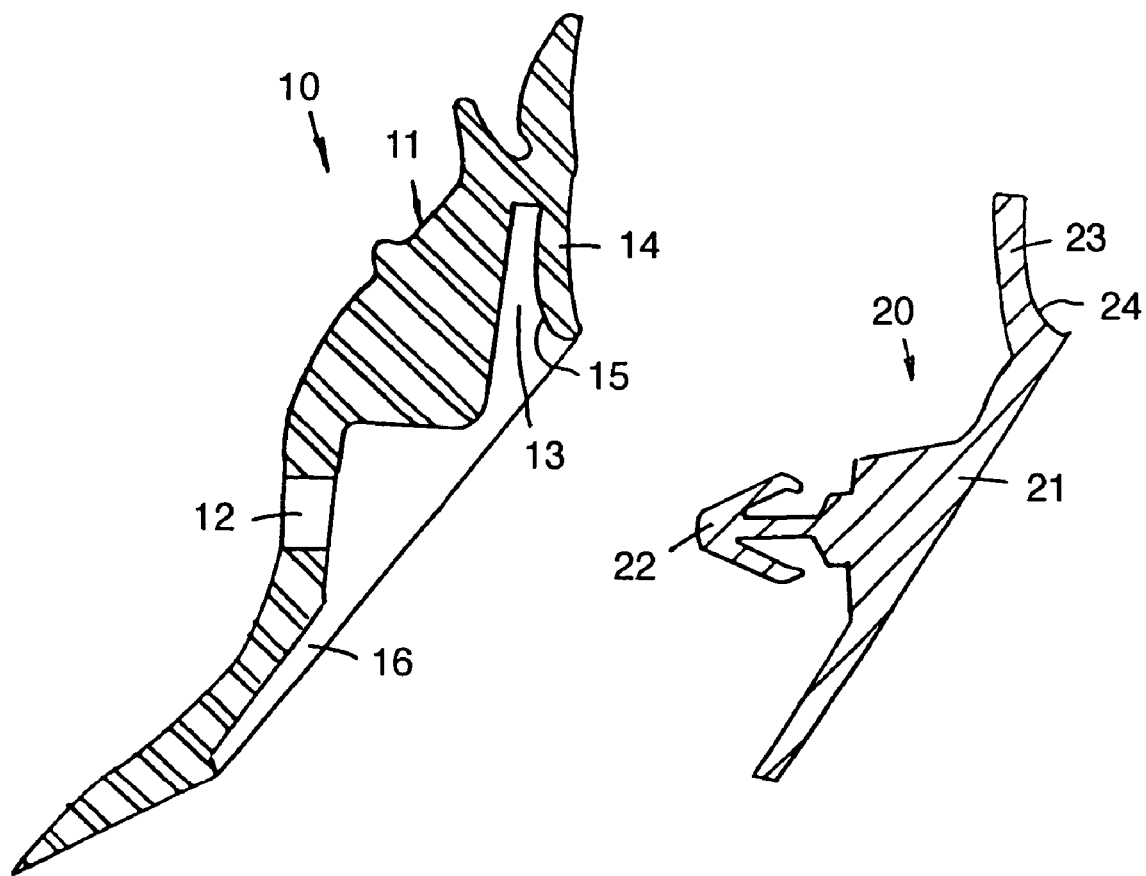
FIG. 7 is an exploded view of the fixing structure shown in FIG. 6.

Further, the insert clip 20 is firmly and integrally fixed to the weather strip 10 as the upper portion of the insert clip 20 fits into the weather strip 10, since the fitting grooves 13, each having an opening at the lower end thereof, are formed in the weather strip 10 (molding part 11), and each of the pawl parts 23 provided at the upper end of the insert clip 20 fits tightly in a corresponding fitting groove 13. As illustrated in FIG. 5, the fitting grooves 13 and the pawl parts 23 may be provided along the longitudinal direction of the car. Further, as illustrated in FIG. 6, there may be provided a space 25 between a root part of the pawl part 23 and the fitting groove 13 so as to improve a fixing operation.

According to this embodiment, no gap is formed between the upper end part of the insert clip 20 and the weather strip 10 (molding part 11), so that a sealing property between the weather strip 10 and the door panel 1 improves. Further, each pawl part 23 fits into a corresponding bag-shaped fitting groove 13, so that the pawl part 23 does not move from its proper position, thereby improving the external appearance of the weather strip 10.

According to the embodiment, an inner surface of an outside wall 14 forming a part of the fitting groove 13 forms a curved convex surface 15, whereas an outside surface of the pawl part 23 which makes a contact with the curved convex surface 15 forms a curved concave surface 24. With such an arrangement, the pawl part 23 makes a contact with the fitting groove 13 in a concave-convex state (retaining state). Accordingly, the pawl part 23 can be firmly fixed to the fitting groove 13 that the pawl part 23 does not drop off from the groove 13, thereby further improving an appearance of the weather strip 10.

According to the embodiment, there is provided an embedding recess 16 at an outer side of the molding part 11 of the weather strip 10 for receiving the body part 21 of the insert clip 20 in flush. As a result, insert clip 20 can be firmly fixed to the weather strip 10 not to protrude out of the weather strip 10 so that they can be firmly and more integrally fixed with each other. Accordingly, a sealing property and external appearance of the weather strip 10 further improves.

According to a fixing structure of a door weather strip of the first aspect of the invention, the insert clip 20 is integrally and firmly fixed to the weather strip 10, since the bag-shaped fitting grooves 13, each having an opening at the bottom end thereof, are formed in the weather strip 10, and each of the pawl parts 23 formed in the insert clip 20 tightly fits in a corresponding fitting groove 13. Accordingly, the sealing property between the weather strip 10 and the door panel 1 as well as an external appearance of the weather strip 10 improve.

According to a fixing structure of a door weather strip of the second aspect of the invention, a sealing property and external appearance improve like the first aspect of the invention. Further, the inner surface of the outside wall 14 which forms a part of the fitting groove 13 forms a curved convex surface 15 while the outside surface of the pawl part 23 forms a curved concave surface 24 for an air tight connection, so that each pawl part 23 makes a contact with a corresponding fitting groove 13 in a concave-convex state (retaining state). This produces a wider connecting area between each of the fitting groove 13 and the pawl part 23, which provides a firmly fixed structure between the insert clip 20 and the weather strip 10, thereby preventing each pawl part 23 from moving from the corresponding fitting groove 13. As a result, a sealing property and an external appearance of the weather strip 10 further improves.

According to a fixing structure of a door weather strip of the third aspect of the invention, there is provided an embedding recess 16 at an outer side of the molding part 11 of the weather strip for receiving the body part 21 of the insert clip 20. Therefore, the insert clip 20 can be firmly and integrally fixed to the weather strip 20 in flush not to protrude out of the weather strip 10. Accordingly, there is improved a sealing property and external appearance of the weather strip 10.

The disclosure of Japanese Patent Application No. 2003-069431 filed Mar. 14, 2003 including specification, claims, and drawings, is incorporated herein by reference.

What is claimed is:

1. A fixing structure of a door weather strip of a car comprising a weather strip and an insert clip for fixing a molding part of said weather strip to a door panel with said insert clip wherein, said molding part of the weather strip comprises an insertion hole and bag-shaped fitting grooves above said insertion hole at an outer side of the car;

each fitting groove comprises an opening at a lower end thereof;

said insert clip comprises a plate-shaped body part, clip part and pawl parts;

said clip part being projected laterally from said body part to be inserted into the insertion hole of the weather strip to fix the weather strip to the door panel;

each pawl part stands upright from an outer end of the body part to tightly fit in a corresponding fitting groove of the weather strip.

2. A fixing structure of a door weather strip of a car comprising a weather strip and an insert clip for fixing a molding part of said weather strip to a door panel with said insert clip wherein, said molding part of the weather strip comprises an insertion hole and bag-shaped fitting grooves above said insertion hole at an outer side of the car;

each fitting groove comprises an opening at a lower end thereof;

said insert clip comprises a plate-shaped body part, clip part and pawl parts;

said clip part being projected laterally from said body part to be inserted into the insertion hole of the weather strip to fix the weather strip to the door panel;

each pawl part stands upright from an outer end of the body part to tightly fit in a corresponding fitting groove of the weather strip;

an inner surface of an outside wall forming said fitting groove forms a curved convex surface;

an outside wall of said pawl part forms a curved concave surface;

said curved convex surface and curved concave surface make an air tight contact with each other.

3. A fixing structure of a door weather strip according to claim 1 wherein an embedding recess is formed at an outer side of the molding part of the weather strip for receiving the body part of the insert clip.

4. A fixing structure of a door weather strip according to claim 2 wherein an embedding recess is formed at an outer side of the molding part of the weather strip for receiving the body part of the insert clip.

* * * * *